United States Patent
Mans et al.

(10) Patent No.: US 10,067,243 B2
(45) Date of Patent: Sep. 4, 2018

(54) EUROPIUM DOPED CAESIUM BROMO IODIDE SCINTILLATOR AND DETECTORS THEREOF WITH IMPROVED CONVERSION EFFICIENCY

(71) Applicant: Agfa HealthCare NV, Mortsel (BE)

(72) Inventors: Ilse Mans, Mortsel (BE); Sabina Elen, Mortsel (BE); Paul Leblans, Mortsel (BE); Luc Struye, Mortsel (BE); Freddy Callens, Mortsel (BE); Henk Vrielinck, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 0 days.

(21) Appl. No.: 15/322,493

(22) PCT Filed: Jun. 17, 2015

(86) PCT No.: PCT/EP2015/063516
§ 371 (c)(1),
(2) Date: Dec. 28, 2016

(87) PCT Pub. No.: WO2016/000956
PCT Pub. Date: Jan. 7, 2016

(65) Prior Publication Data
US 2017/0168167 A1  Jun. 15, 2017

(30) Foreign Application Priority Data
Jul. 3, 2014  (EP) .................................. 14175634

(51) Int. Cl.
*G01T 1/20*  (2006.01)
*C09K 11/77*  (2006.01)
*G01T 1/202*  (2006.01)

(52) U.S. Cl.
CPC ........ *G01T 1/2023* (2013.01); *C09K 11/7733* (2013.01); *G01T 1/2006* (2013.01)

(58) Field of Classification Search
CPC ......................... G01T 1/2023; C09K 11/7733
See application file for complete search history.

(56) References Cited

U.S. PATENT DOCUMENTS 7,558,412 B2  7/2009  Granfors et al.
7,560,046 B2  7/2009  Lyons et al.
(Continued)

FOREIGN PATENT DOCUMENTS

EP   1 113 290 A2   7/2001
EP   1 890 299 A1   2/2008
(Continued)

OTHER PUBLICATIONS

Official Communication issued in International Patent Application No. PCT/EP2015/063516, dated Jul. 15, 2015.
(Continued)

*Primary Examiner* — Casey Bryant
(74) *Attorney, Agent, or Firm* — Keating & Bennett, LLP (57) ABSTRACT

A scintillator includes $CsBr_xI_{(1-x)}$ doped with Europium ($CsBr_xI_{(1-x)}$:Eu) wherein x<0.5, and is obtained by annealing $CsBr_xI_{(1-x)}$:Eu material at a temperature from 50° C. to 280° C. The EPR spectrum of the obtained scintillator measured at room temperature at a frequency of 34 GHz shows a maximum signal height at a magnetic field of 1200 mT, and the signal height at 1090 mT and 1140 mT does not exceed 40%, wherein the normalized signal height percentage at 1200 mT is calculated to be 100%. The scintillator is useful in a high energy radiation detection and radiography imaging apparatus.

17 Claims, 6 Drawing Sheets

(56) References Cited

U.S. PATENT DOCUMENTS

2007/0108393 A1     5/2007    Shoji et al.
2008/0169432 A1     7/2008    Tahon et al.

FOREIGN PATENT DOCUMENTS

EP     1 944 350 A2     7/2008
EP     2 067 841 A1     6/2009

OTHER PUBLICATIONS

Cherginets et al., "Luminescent properties of CsI single crystals grown from the melt treated with $EuI_2$", Cryst. Res. Technol. vol. 47, No. 6, 2012, pp. 684-688.

Thacker et al., "Low-Afterglow CsI:Tl microcolumnar films for small animal high-speed microCT", NIH Public Access Author Manuscript, Nuclear Instruments and Methods in Physics Research A, vol. 604, No. 1, Jun. 1, 2009, pp. 1-13.

Gektin et al., "Radiation damage of CsI:Eu crystals", Functional Materials, vol. 20, No. 2, 2013, pp. 145-148.

Gektin et al., "Europium emission centers in CsI:Eu crystal", Optical Materials vol. 35, 2013, pp. 2613-2617.

Giokaris et al., "Comparison of CsI(Tl) and CsI(Na) partially slotted crystals for high-resolution SPECT imaging", ScienceDirect, Nuclear Instruments and Methods in Physics Research A, vol. 569, 2006, pp. 185-187.

Yang et al., "Crystal growth and scintillation properties of $Cs_3EuI_5$ crystals", Journal of Crystal Growth vol. 318, 2011, pp. 833-835.

EUROPIUM DOPED CAESIUM BROMO IODIDE SCINTILLATOR AND DETECTORS THEREOF WITH IMPROVED CONVERSION EFFICIENCY

CROSS REFERENCE TO RELATED APPLICATIONS

This application is a 371 National Stage Application of PCT/EP2015/063516, filed Jun. 17, 2015. This application claims the benefit of European Application No. 14175634.6, filed Jul. 3, 2014, which is incorporated by reference herein in its entirety.

BACKGROUND OF THE INVENTION

1. Field of the Invention

The present invention relates to a scintillator comprising $CsBr_xI_{(1-x)}$ doped with europium ($CsBr_xI_{(1-x)}$:Eu). The scintillator shows a high conversion efficiency for high energy radiation detection and a low afterglow. Therefore, the invention also relates to digital radiography flat panel detectors (FPDs) and high energy radiation detectors comprising the $CsBr_xI_{(1-x)}$:Eu scintillator with high conversion efficiency. The present invention is useful in the X-ray imaging field, in particular where a high quality image is important and for high energy radiation detection applications as well.

2. Description of the Related Art

Inorganic scintillators are employed in most of the current medical diagnostic imaging modalities using X-rays or gamma rays.

In digital radiography (DR) flat panel detectors (FPDs), which are X-ray detectors that capture images from objects during inspection procedures or from body parts of patients to be examined, scintillators are used to convert X-rays into light. This light interacts with an amorphous silicon (a-Si) semiconductor sensor layer, where electrical charges are created. The charges are collected by thin film transistors (TFT's) which are arranged in an array. The transistors are switched-on row by row and column by column to read out and the collected charges are transformed into a voltage, which is transformed into a digital number and stored in a computer to make up a digital image corresponding with the shadow image of the irradiated object. This way of conversion of X-rays into electrical charges is called indirect conversion direct radiography (ICDR). Typical scintillating material for use in ICDR is caesium iodide doped with thallium (CsI:Tl).

Scintillators are also particularly useful for the detection of high energy radiation in combination with a photomultiplier tube (PMT). When high energy radiation interacts with the scintillator material, photons are created that can activate the PMT. The scintillation light is emitted isotropically; so the scintillator is typically surrounded with reflective material to minimize the loss of light and then is optically coupled to the photocathode of the PMT. Scintillation photons incident on the photocathode liberate electrons through the photoelectric effect, and these photoelectrons are then accelerated by a strong electric field in the PMT. The output signal produced is proportional to the energy of the gamma ray in the scintillator. High energy radiation detectors based on a scintillator and a PMT are useful in detection of radiation in gamma ray cameras and positron scanners (Positron Emission Tomography and single-photon emission computed tomography). High energy radiation detectors are also used in scintillation counting mode for measuring radiation in activation analysis, X-ray fluorescent analysis, Transmission Electron Microscopy (TEM), Time of Flight Mass Spectrometry (TOF MS), high energy physics collision detection and detection of cosmic rays. Scintillators which are coupled with a photomultiplier tube (PMT) are used in survey meters to detect radioactive contamination, monitoring and testing nuclear material.

Scintillators are also used in security, baggage cargo and personal screening. Another important application of scintillators is in dosimetry for personal safety dosimeters. Dosimeters are used to measure the radiation dose received by body, tissue and matter, received from indirect or direct ionizing radiation. It is very important that the dosimeter or other detection radiation device has a high sensitivity and can detect any level of radiation.

The scintillation conversion is a relatively complicated process that can be generally divided in three sub-processes: conversion, transport and luminescence. These three steps determine the emission efficiency of the scintillator material. In this respect, structured scintillators made of inorganic materials crystals doped with an activator element, such as sodium iodide doped with thallium (NaI:Tl) or caesium iodide doped with thallium (CsI:Tl), were developed to allow detecting and monitoring higher energy X- or γ-rays (high energy: below ~1 MeV) and are employed in the (X- or γ-rays) photon counting regime.

The mechanism of luminescence of scintillators consists in accumulating the generated light arriving soon after the initial conversion stage is accomplished and the most important parameters determining the conversion efficiency are: (1) the light yield or conversion efficiency; (2) the X-ray stopping power; (3) the decay time; (4) the spectral match between the scintillator emission spectrum and the sensitivity spectrum of the photosensitive detector; (5) the chemical stability and radiation resistance of the scintillator; and (6) the energy resolution. The conversion efficiency of a scintillator can be measured in a relative way, i.e. by measuring the light emission of the scintillator under study and comparing the results with the measurements of a known standard scintillator, as a reference. By improving the conversion efficiency of scintillators better image quality and shorter image acquisition time can be obtained.

Despite the acknowledged advantages of CsI:Tl in many scintillator applications with respect to conversion efficiency, a characteristic property that undermines its use in high-speed radiographic and radionuclide imaging is the presence of a strong afterglow component in its scintillation decay. This causes pulse pile up in high count-rate applications, reduced energy resolution in radionuclide imaging, and reconstruction artefacts in computed tomography applications. Another disadvantage of CsI:Tl is the presence of very toxic Tl. The very toxic Tl represents an important safety issue in production of CsI:Tl based scintillators. With regard to the high energy radiation detectors based on a combination of a scintillator with a PMT, the spectrum of the emitted light of CsI(Tl) with its maximum at 550 nm does not match very well the sensitivity spectrum of the photocathode of the PMT having a maximum between 400 and 450 nm.

Europium doped caesium bromo iodide ($CsBr_xI_{(1-x)}$:Eu) based scintillators, with a high content of iodide (x<0.5) show a very low afterglow level, do not include a highly toxic Tl activator and their emission spectrum matches well the sensitivity spectrum of the photocathode of a PMT. $CsBr_xI_{(1-x)}$:Eu based scintillators however do not show a high conversion efficiency. It is thus desirable to increase the conversion efficiency of $CsBr_xI_{(1-x)}$:Eu in an easy and reliable manner. Therefore, research has been done to improve the conversion efficiency while maintaining the advantage of a low afterglow level of europium doped CsI material.

U.S. Pat. No. 7,560,046 relates to a scintillator material that increases the conversion efficiency by avoiding the production of radiation damages that can lead to the occurrence of ghost images. Therefore, this document discloses an annealed scintillator composition with a formula of $A_3B_2C_3O_{12}$, where A is at least one member of the group consisting of Tb, Ce, and Lu, or combinations thereof; B is an octahedral site (Al), and C is a tetrahedral site (also Al). One or more substitutions are included. These materials do not include alkali halide compounds doped with at least one activator compound.

Cherginets et al. (Luminescent properties of CsI single crystals grown from the melt treated with $EuI_2$—V. L. Cherginets, T. P. Rebrova, Yu. N. Datsko, V. F. Goncharenko, N. N. Kosinov, R. P. Yavetsky, and V. Yu. Pedash Cryst. Res. Technol. 47, No. 6, 684-688. 2012) studied the scavenger properties of super-pure alkaline earth halides, namely CsI single crystals compositions doped with different concentrations of europium in the form of $EuI_2$, from $10^{-4}$ to $10^{-2}$ mol·kg$^{-1}$. The luminescent properties of CsI:Eu crystals are attributed to the distortion of the crystal lattice and not necessarily to the doping of Eu. The proven improvement of the Eu dopant is the reduction of afterglow by suppression of the slow components of the scintillator pulse, which occurs at $EuI_2$ concentration in CsI melt equal to 0.01 mol·kg$^{-2}$.

Thacker et al. (Low-Afterglow CsI:Tl microcolumnar films for small animal high-speed microCT—S. C. Thacker, B. Singh, V. Gaysinskiy, E. E. Ovechkina, S. R. Miller, C. Brecher, and V. V. Nagarkar, Nucl. Instrum. Methods Phys. Res. A. 2009 Jun. 1, 604(1), 89-92) discovered that adding a second dopant $Eu^{2+}$ to CsI:Tl reduces afterglow with a factor of 40 at 2 ms after a short excitation pulse of 20 ns, and with a factor of 15 at 2 ms after a long excitation pulse of 100 ms. The Eu is added to reduce the afterglow, and it is not used as a scintillator activator.

EP1113290 relates to the improvement in output decrease over time of the scintillator, by adding a light absorbing layer between the scintillator and a light sensitive imaging array. This is to reduce the rate at which the light sensitive imaging array saturates, to reduce light incident on the switching devices, and/or to compensate for the aging of a scintillator. The invention is related to the improvement of the efficiency after degradation due to operation.

U.S. Pat. No. 7,558,412 discloses a method for detecting the potential of an X-ray imaging system to create images with scintillator hysteresis artefacts. The method comprises measuring signal levels for different areas of interest and comparing all measurements with a given threshold to determine if scintillator hysteresis artefacts may be produced by a certain scintillator in result from a large x-ray flux dose. Said effect can occur even in scintillators including CsI doped with Tl (CsI:Tl). U.S. Pat. No. 7,558,412 further discloses that the method may optionally include exposing the scintillator to an x-ray flux if the difference between the two signals obtained is greater than a given threshold and thus detecting the potential of said scintillator to produce image artefacts. The method is connected to "bleaching" of the scintillator to the original level of efficiency (before irradiation) and not adding it.

In Gektin et al. (Radiation damage of CsI:Eu crystals. Functional Materials, 20; n.2 (2013)—STC "Institute for Single Crystals" of National Academy of Sciences of Ukraine) a study is presented on the radiation damage and afterglow nature for CsI:Eu crystals concluding that the luminescence parameters depend on the X-ray irradiation conditions and that irradiation leads to emission suppression at doses less than 100 Gy when the induced absorption was not observed yet.

In another document, Gektin et al. (Europium emission centers in CsI:Eu crystal. Optical Materials 35 (2013), 2613-2617) the absorption, excitation and luminescence spectra of pure and Eu doped single crystals were studied depending on the activator content, the excitation energy, the heat treatment and the X-ray radiation. It is shown that the structure and concentration of the complex centres changes at heat treatment. Only an increase of annealing temperature from 300° C. to 405° C., followed by quenching, has a marked influence on the spectral composition and intensity of luminescence.

Giokaris et al. (Nuclear Instruments and Methods in Physics Research A 569 (2006) 185-187) compared scintillators based on CsI:Tl and CsI:Na crystals, coupled with Position Sensitive Photomultiplier Tubes (PSPMTs) for gamma-ray detection with respect to their performance in terms of sensitivity, spatial and energy resolution. CsI:Na based scintillators are very hygroscopic and hence difficult to coat via a dispersion. CsI:Tl based scintillators have a light emission spectrum which matches less good with the sensitivity spectrum of the PMT than CsI:Eu and CsI:Tl crystals are obtained after a long and hence expensive production process.

Document EP1944350A2 discloses the method of optimizing speed of storage phosphor needle image plates (NIP), particularly europium doped caesium bromide (CsBr:Eu), by annealing. The object of this patent is realised with the marker of stable Eu-ligand complexes measured with electron paramagnetic resonance (EPR). The peaks of the EPR signal are measured at the frequency of 34 GHz and the following flux density of magnetic filed are specified: 880, 1220, 1380 and 1420 mT. Europium doped caesium bromide (CsBr:Eu) is very hygroscopic and the methods of applying this material onto a substrate are therefore not compatible with a coating process from a coating dispersion.

EP2067841 discloses a phosphor storage plate based on a binderless needle-shaped Cs(X,X'), X representing Br and X' representing F, Cl, Br, I but no specific combination of X being Br with X' being I is disclosed.

However, none of these documents discloses a method of production that increases the conversion efficiency of $CsBr_xI_{(1-x)}$:Eu as a scintillator and maintaining the advantage of a low afterglow level of europium doped $CsBr_xI_{(1-x)}$ material.

SUMMARY OF THE INVENTION

The above stated problem is solved by europium doped $CsBr_xI_{(1-x)}$ material with x<0.5 which is annealed and which is optionally exposed to electromagnetic radiation, leading to a scintillator having a high conversion efficiency for X-rays and high energy radiation and showing a low level of afterglow.

Preferred embodiments of the present invention provide a high energy radiation detection apparatus.

Other preferred embodiments of the present invention provide a radiography flat panel detector.

Still other preferred embodiments of the present invention provide methods of preparing europium doped $CsBr_xI_{(1-x)}$ scintillators in an easy and straightforward way.

Further advantages and preferred embodiments of the present invention will become apparent from the following description and the claims.

DETAILED DESCRIPTION OF THE PREFERRED EMBODIMENTS

1. Raw Materials

Caesium bromo iodide $CsBr_xI_{(1-x)}$) doped with Europium (Eu) wherein x<0.5, can be obtained starting from CsI, optionally CsBr and Eu containing compounds as raw materials. Eu containing compounds can be: pure Europium, europium oxides ($Eu_2O_3$, $Eu_3O_4$), europium halides ($EuF_2$, $EuF_3$, $EuCl_2$, $EuCl_3$, $EuCl_2.2H_2O$, $EuCl_2.6H_2O$, $EuBr_3$, $EuI_2$, $EuI_3$), europium oxyhalides ($Eu_mO_nX_{3m-2n}$, where X=F, Cl, Br or I), europium chalcogenides (EuS, EuSe, EuTe), europium nitrides (EuN) or other europium complexes ($CsEuBr_3$, $Eu(C_5H_7O_2)_3$, $EuBaTiO$, $CsEuI_3$, etc.). The most preferred ones are $EuCl_3$, $EuBr_3$, $EuI_2$, $CsEuBr_3$, due to the close proximity of melting point to the melting point of CsI (621° C.), and europium oxyhalides, because they decompose into europium oxides and europium halides upon heating.

The ratio of CsI and CsBr is chosen as to obtain a $CsBr_xI_{(1-x)}$ material with x<0.5, preferably <0.1, most preferably x<0.05. Throughout the text when specifying $CsBr_xI_{(1-x)}$ without mentioning the value of x, x is then assumed to be <0.5. Both CsI and optionally CsBr can be mixed to achieve a homogeneous composition in powder form or in liquid solution but they can also be provided separately.

The molar ratio of the $CsBr_xI_{(1-x)}$ and Eu is preferably in the range of 99.9/0.1 to 98/2, and more preferably from 99.5/0.5 to 99/1. To obtain these molar ratios, the CsI and optionally CsBr and the Eu compound(s) can be mixed to achieve a homogeneous composition in powder form or in liquid solution but they can also be provided separately. Preferably the CsI, and optionally CsBr are mixed with the Eu compounds in the gas phase.

Optionally, the raw materials can be purified before the scintillator is prepared, and pre-heated to evaporate the present water.

2. Preparation of the $CsBr_xI_{(1-x)}$:Eu Material 2.1. Vapour Deposition of the $CsBr_xI_{(1-x)}$:Eu Material In a preferred embodiment, the $CsBr_xI_{(1-x)}$:Eu material can be produced with a physical vapour deposition process (PVD) of CsI, optionally CsBr and Eu compounds ($EuCl_3$, $EuBr_3$, $EuI_2$, $CsEuBr_3$, $Eu_mO_nX_{3m-2n}$) onto a substrate in a vacuum deposition chamber, where at least one crucible is filled with powder of the selected compounds and heated to a temperature not higher than 750° C. During the physical vapour deposition process, the CsI, CsBr and Eu compounds are mixed in the gas phase. Another preferred embodiment is to use mixed crystals such as $CsBr_yI_{(1-y)}$ wherein y<1. In a more preferred embodiment, only CsI and Eu containing compounds are used as raw material in the preparation of the scintillator. This so obtained scintillator is assumed to essentially consist of CsI and Eu, hence x=0, and is denoted as CsI:Eu.

More preferably, the compounds are evaporated from at least 2 crucibles at the same time. Eu is evaporated from at least one separate crucible comprising only the Eu containing compound, in order to get a more constant evaporation rate and, hence, a more homogeneous Eu distribution in function of the thickness of the deposited layer.

The vapour deposited $CsBr_xI_{(1-x)}$:Eu material comprises crystals which can have a needle like structure or can be non-needle like, depending on the circumstances of deposition and the thickness of the deposited layer.

The time of the evaporation in a vacuum deposition chamber is preferably between 30 and 360 min. After the evaporation the $CsBr_xI_{(1-x)}$:Eu material is cooled down and removed from the vacuum deposition chamber.

The substrate for the deposition of the $CsBr_xI_{(1-x)}$:Eu material, can be either rigid or flexible, such as an aluminium plate, an aluminium foil, a film of polyethylene terephthalate (PET), polyethylene naphthalate (PEN), polyimide (PI), polyethersulphone (PES), polyphenylsulfone (PPSU), polyphenylene sulphide (PPS), polyether etherketon (PEEK), polybutylene terephthalate (PBT), polyetherimide (PEI), a metal foil, a carbon fibre reinforced plastic (CFRP) sheet, glass, flexible glass, triacetate and a combination thereof or laminates thereof. More preferable substrates are flexible substrates: metal foils, especially of aluminium, foils of polyethylene terephthalate (PET), polyethylene naphthalate (PEN), polyimide (PI), polyethersulphone (PES), polyphenylsulfone (PPSU), polyphenylene sulphide (PPS) and combinations thereof or laminates thereof. The substrates can have a thickness between 20 and 800 μm, preferably between 70 and 300 μm.

Optionally the substrate, prior to the deposition of the $CsBr_xI_{(1-x)}$:Eu material can be coated with additional functional layer(s), for example to improve the adhesion, to cover the visible pattern of the surface of the substrate, to protect from moisture or chemicals, etc. Examples of additional functional layers are disclosed in the unpublished application EP14166151.2, [0032] and [0037]. The combination of a $CsBr_xI_{(1-x)}$:Eu material applied on a substrate is hereafter denoted as a scintillator screen.

In a preferred embodiment of the invention, the $CsBr_xI_{(1-x)}$:Eu material can be directly deposited onto the detector of a FPD. The detector comprises a plurality of photosensitive elements which can convert light into an electric signal. Examples of photosensitive elements are amorphous Si, CMOS and CCD.

In another preferred embodiment, the $CsBr_xI_{(1-x)}$:Eu material can be directly deposited onto the radiation entrance window of a PMT.

When producing a scintillator for FPD applications, $CsBr_xI_{(1-x)}$:Eu material with a needle like crystal structure is preferred. The preferred thickness for these layers varies in the range from 150 to 500 μm, the coating weight varies in the range from 40 to 250 mg/cm$^2$ and the needle diameter varies in the range from 2 to 10 μm. The preferred concentration of Eu in the deposited $CsBr_xI_{(1-x)}$:Eu material is from 1 to 10000 ppm.

2.2. Alternative Methods of Preparation of the $CsBr_xI_{(1-x)}$:Eu material

In a preferred embodiment of the invention, the $CsBr_xI_{(1-x)}$:Eu material can also be prepared by mixing CsI, optionally CsBr with one or more Eu containing compounds and by heating the obtained powder mixture in an oven. A temperature of at least equal to the melting point of one of the components, preferably higher than 620° C. is required. The obtained $CsBr_xI_{(1-x)}$:Eu material is denoted hereafter as fired $CsBr_xI_{(1-x)}$:Eu. The obtained $CsBr_xI_{(1-x)}$:Eu material which has usually the form of a brick, can be pulverised before the annealing step.

In another preferred embodiment, the $CsBr_xI_{(1-x)}$:Eu material can be produced by mixing powders of CsI; optionally CsBr and one or more Eu containing compounds. The powders are then pulverized. This can be done by any suitable pulverization method.

In another preferred embodiment, the $CsBr_xI_{(1-x)}$:Eu material can be produced by a crystal growth method as Czochralski, Bridgman-Stockbarger, Kyropoulos or any other known crystal growth techniques. In those cases the crystal is grown from the melt of CsI and one or more Eu containing compounds or from a melt of $CsBr_xI_{(1-x)}$ and one or more Eu containing compounds. The crystals can be pulverized to obtain small particles.

2.3. Deposition of $CsBr_xI_{(1-x)}$ Material from a Dispersion

According to a preferred embodiment of the present invention, the $CsBr_xI_{(1-x)}$:Eu material with x<0.5 as obtained in the previous sections can be applied on a substrate from a dispersion. Therefore, the $CsBr_xI_{(1-x)}$:Eu material is pulverized to obtain small particles. Preferably the median particle size of the $CsBr_xI_{(1-x)}$:Eu particles to be applied as a dispersion is between about 0.5 μm and about 40 μm. A median particle size of between 1 μm and about 20 μm is more preferred for optimizing properties, such as speed, image sharpness and noise.

In a highly preferred embodiment of the invention, the fired $CsBr_xI_{(1-x)}$:Eu material is first prepared by mixing CsI with optionally CsBr and with one or more Eu containing compounds, heating the obtained powder mixture in an oven at a temperature of at least equal to the melting point of one of the compounds. After heating, the mixture is cooled down to obtain a brick of $CsBr_xI_{(1-x)}$:Eu which is then pulverized. The pulverized $CsBr_xI_{(1-x)}$:Eu material can then be added to a solution comprising a binder to obtain a dispersion of $CsBr_xI_{(1-x)}$:Eu particles.

In another preferred embodiment of the invention, the $CsBr_xI_{(1-x)}$:Eu is first prepared by the PVD technique as described above, then removed from the substrate and pulverized to obtain small particles. The pulverized $CsBr_xI_{(1-x)}$:Eu material can then be added to a solution comprising a binder to obtain a dispersion of $CsBr_xI_{(1-x)}$:Eu particles.

A preferred method of applying the $CsBr_xI_{(1-x)}$:Eu particles to a substrate is via a coating process in which a layer is applied on the substrate from the dispersion of $CsBr_xI_{(1-x)}$:Eu particles. The dispersion can be applied on a substrate using a coating knife, preferably a doctor blade and is hereafter denoted as a coating dispersion. The coating is dried, preferably in an oven or with hot air to obtain a scintillator screen.

In another preferred embodiment of the invention, $CsBr_xI_{(1-x)}$:Eu is deposited from a dispersion with preferably a high viscosity, meaning a viscosity higher than 2 Pa*s. The dispersion is applied on a substrate using a mould and is dried to obtain a scintillator screen. Examples of suitable substrates are described above.

In a preferred embodiment of the invention, the $CsBr_xI_{(1-x)}$:Eu material is produced by mixing CsI, CsBr and Eu compounds together in a solvent to obtain a dispersion.

Suitable solvents for the preparation of the dispersion can be acetone, hexane, methyl acetate, ethyl acetate, isopropanol, methoxy propanol, isobutyl acetate, ethanol, methanol, methylene chloride and water.

Binders suitable for the preparation of a coating dispersion can be inorganic binders or organic binders. Examples of organic polymers are cellulose acetate butyrate, polyalkyl (meth)acrylates, polyvinyl-n-butyral, poly(vinylacetate-co-vinylchloride), poly(acrylonitrile-co-butadiene-co-styrene), poly(vinyl chloride-co-vinyl acetate-co-vinylalcohol), poly (butyl acrylate), poly(ethyl acrylate), poly(methacrylic acid), poly(vinyl butyral), trimellitic acid, butenedioic anhydride, phthalic anhydride, polyisoprene and/or a mixture thereof. Preferably, the binder comprises one or more styrene-hydrogenated diene block copolymers, having a saturated rubber block from polybutadiene or polyisoprene, as rubbery and/or elastomeric polymers. Particularly suitable thermoplastic rubbers, which can be used as block-copolymeric binders, in accordance with this invention, are the KRATON™ G rubbers, KRATON™ being a trade name from SHELL.

Examples of suitable inorganic binders are alumina, silica or alumina nanoparticles, aluminium phosphate, sodium borate, barium phosphate, phosphoric acid, barium nitrate. Inorganic binders have the advantage of a higher resistance to the annealing step, especially if the annealing step is performed at temperatures in the high temperature range.

The annealing step of the $CsBr_xI_{(1-x)}$:Eu particles (see below) can be performed before the preparation of the coating dispersion or after the coating and drying of the deposited layer. Preferably, the annealing step of the $CsBr_xI_{(1-x)}$:Eu particles is done before the preparation of the coating dispersion because a higher temperature of annealing is possible due to the absence of binder in the material to be annealed.

3. Annealing

The $CsBr_xI_{(1-x)}$:Eu material as obtained by any of the above described methods is annealed to obtain a scintillator according to a preferred embodiment of the present invention. It has been found that by annealing the $CsBr_xI_{(1-x)}$:Eu, the conversion from X-rays into light by the scintillator is greatly enhanced. It has been found that the $CsBr_xI_{(1-x)}$:Eu scintillator after annealing within a specific temperature range shows a very characteristic electron paramagnetic resonance (EPR) spectrum.

The annealing step can be performed on deposited $CsBr_xI_{(1-x)}$:Eu material, e.g. vapour deposited needle like crystals or on $CsBr_xI_{(1-x)}$:Eu material which has been pulverized. The pulverized material can be obtained by removing and pulverizing the deposited layer, or by pulverizing a brick of fired material or by pulverizing crystals grown via crystal growth techniques such as Czochralski, Bridgman-Stockbarger or Kyropoulos methods. Alternatives methods for pulverizing are milling or grinding. All of these methods can be performed by apparatus known in the art. By pulverizing, the specific surface of the $CsBr_xI_{(1-x)}$:Eu material is enhanced. Also in case of layers comprising needle like crystals the specific surface is comparable with pulverized material. The specific surface of the $CsBr_xI_{(1-x)}$:Eu material to be annealed is preferably more than 1 $cm^2/g$, more preferably between 2 and 600 $cm^2/g$, most preferably between 20 and 200 $cm^2/g$. The enhancement of the annealing effect with $CsBr_xI_{(1-x)}$:Eu material having an increased specific surface is thought to be that upon annealing $Eu^{2+}$ monomer centres must be stabilized by water molecules and which can be incorporated into the material. The higher the specific surface of the $CsBr_xI_{(1-x)}$:Eu material is, the easier water can diffuse throughout the volume of the material. The presence of stabilized $Eu^{2+}$ monomers seems to be essential to enhance the conversion efficiency from X-rays into light. The specific surface of the needle like crystals is calculated based on following equation: $1/r \cdot d$ (r being the radius of the needle which is considered to be a cylinder; d being the density of the $CsBr_xI_{(1-x)}$:Eu material and is equal to 4.5 $g/cm^3$). For the calculation of the specific surface of the non-needle like crystals, these crystals are considered to be spheres and the specific surface is according to the following equation: $3/r \cdot d$ (r being the radius of the sphere; d being the density of the $CsBr_xI_{(1-x)}$:Eu material and is equal to 4.5 $g/cm^3$).

In case of preparation of a $CsBr_xI_{(1-x)}$:Eu scintillator screen from a dispersion, the annealing step can be performed before the preparation of the dispersion or after the drying step which followed the coating or deposition step.

By annealing the $CsBr_xI_{(1-x)}$:Eu material, activator centres are probably produced which are responsible for the luminescence as can be shown via electron paramagnetic resonance (EPR). The EPR spectra can be measured by any suitable Q band EPR spectrometer operating at frequency of 34 GHz. EPR detects stable Eu-ligand-complexes. The measured EPR spectra are usually presented as the slope of the measured EPR signal in function of the magnetic field. If in the text, reference is made to an EPR spectrum, spectra are meant wherein the slope of the measured EPR signal is plotted in function of the magnetic field. The EPR spectra of annealed $CsBr_xI_{(1-x)}$:Eu material measured at a frequency of 34 GHz at room temperature (25° C.) shows at least a maximum in signal height at a magnetic field of 1200 mT (see FIG. 1, FIG. 5 and FIG. 6). The maximum in signal height at 1200 mT showing the largest peak height from all maxima. The peak height is defined as the difference between the absolute value of the signal at its maximum and the value of the signal at the minimum situated at the lower side in magnetic field of the peak. The maxima signal height at 1090 mT and 1140 mT does not exceed 40%, wherein the normalised signal height percentage at 1200 mT is being calculated as 100%. The above mentioned values in magnetic field, at which the maxima and minima in signal height occur, are not to be seen as absolute values but as values having a range of ±15 mT due to the experimental error of the measuring method or the variation in composition of the $CsBr_xI_{(1-x)}$.

Annealing of the $CsBr_xI_{(1-x)}$ material can be performed by exposing the material to heat so as to obtain a temperature of the material in a range from 50 to 280° C., preferably from 100 to 230° C., more preferably from 130° C. to 200° C. and for a time period of at least 5 min, preferably at least 30 min. The temperature and time period of annealing are very closely related to each other. This is the case for the conversion efficiency for high energy electromagnetic irradiation of the scintillator but also for the stability of this conversion efficiency. Exposing the $CsBr_xI_{(1-x)}$:Eu material to heat so as to obtain a temperature which is higher than 280° C., e.g. 300° C., is called over-annealing. Over-annealing the $CsBr_xI_{(1-x)}$:Eu material does not lead to a scintillator showing an increase in conversion from X-rays into light, or at least an increase in conversion from X-rays into light which is significantly lower than by annealing at a temperature between 50 to 280° C. Moreover, after over-annealing, the obtained scintillator does not show an EPR spectrum having a maximum in signal height at a magnetic field of 1200 mT showing the largest peak of all maxima.

In a preferred embodiment the annealing step is performed in an oven with air circulation. This oven can operate in ambient conditions. The $CsBr_xI_{(1-x)}$ material can be put in the oven before the oven is starting up heating. The material is then heated in the oven while the temperature in the oven is increased to the target temperature at which the annealing has to be performed. Another way of annealing is to put the $CsBr_xI_{(1-x)}$ material in the oven when the oven is already at the target temperature. After the required time period of exposure to heat has lapsed, the $CsBr_xI_{(1-x)}$ material is cooled down to room temperature. This cooling down can be done by removing the material from the oven or by turning off the heating of the oven and allow the material to cool in the oven. Optionally, annealing can be performed in oven under vacuum, oxygen, nitrogen, argon or dry air flow.

Most preferably, the annealing step can be performed at a temperature in the range from 150 to 200° C. during 15 to 120 min, in the oven with air circulation without ventilation.

In case of evaporated or coated scintillator layers, if after preparation of said scintillator the layer is yellow, for example due to an excess of I2 ions, annealing can strongly reduce staining by which the light emission by the scintillator is also further increased.

4. Irradiation

In a preferred embodiment of the invention, the annealed $CsBr_xI_{(1-x)}$:Eu scintillator can be exposed to electromagnetic radiation having a wavelength between 1 pm and 800 nm, including X-rays, high energy electromagnetic radiation, UV light and visible light to further increase the conversion efficiency. X-rays is an electromagnetic radiation having a wavelength in the range of 0.01 to 10 nanometers, corresponding to frequencies in the range of 30 petahertz to 30 exahertz ($3 \times 10^{16}$ Hz to $3 \times 10^{19}$ Hz) and energies in the range 100 eV to 100 keV.

In case of X-ray exposure the total irradiation dose is between 0.1 and 1200 Gy, preferable between 1.5 and 150 Gy, and most preferably between 3 and 60 Gy. The dose can be delivered in one step or in multiple steps. The total dose delivered to the scintillator is in the range of 0.01 to 100 Gy/min, preferably the total dose delivered is in the range of 0.1 to 10 Gy/min, and most preferably in delivered doses of 0.2 to 2 Gy/min. The total time of exposure is 0.01 min to 2800 min, preferably between 60 min and 360 min.

In case of exposure to UV light, having a wavelength between 100 and 400 nm, the total electromagnetic radiation dose is between 10 and 300000 $J/m^2$. Preferably the dose is between 200 and 35000 $J/m^2$, and most preferably between 900 and 10000 $J/m^2$.

In case of exposure with visible light having a wavelength of 300 to 800 nm, the total light dose is between 10 and 400000 $J/m^2$. Preferably the dose is between 2000 and 200000 $J/m^2$, and most preferably between 8000 and 40000

J/m². Within the visible light irradiation, a range of 300 to 600 nm, more preferably between 300 nm and 500 nm is preferred.

By using any of the above described irradiation methods, it is possible to obtain a $CsBr_xI_{(1-x)}$:Eu scintillator having increased conversion efficiency with respect to the non irradiated but annealed $CsBr_xI_{(1-x)}$:Eu scintillator. The X-ray and UV radiation lead to an increase at least of 2 relative to non irradiated $CsBr_xI_{(1-x)}$:Eu scintillators, while for the irradiation with visible light, the increase is smaller and on average of a factor 2, meaning that scintillators are obtained with a very high conversion efficiency for X-conversion.

The $CsBr_xI_{(1-x)}$:Eu scintillator after annealing and after the exposure to electromagnetic radiation shows the same characteristic EPR spectra as before the exposure to the electromagnetic radiation.

The exposure to the electromagnetic radiation can be done on the $CsBr_xI_{(1-x)}$:Eu scintillator, but preferably on the $CsBr_xI_{(1-x)}$:Eu scintillator screen.

5. Radiological Image and Detection Apparatus

The scintillators are suitable as scintillators in radiological image detection apparatus such as FPDs and in high energy radiation detection apparatus.

When producing FPDs with scintillators according to a preferred embodiment of the present invention, the scintillator can be applied on a substrate as described above and coupled to a detector comprising a plurality of photosensitive elements which can convert light into an electric signal (for example: amorphous Si, CMOS or CCD) with an intermediate adhesive layer. Suitable ways to couple the scintillator screen to the detector are described in US20140014843A, US20130313438A, US20130134312A, and U.S. Pat. No. 7,011,9304. In another preferred embodiment, the $CsBr_xI_{(1-x)}$:Eu scintillator can be directly deposited onto the detector comprising a plurality of photosensitive elements which can convert light into an electric signal.

The FPDs based on $CsBr_xI_{(1-x)}$:Eu scintillators can be obtained after or before annealing the $CsBr_xI_{(1-x)}$:Eu material. The annealing is preferably performed after the scintillator was applied onto a substrate (scintillator screen) and before the coupling is done with the detector of the FPD.

In a preferred embodiment, the $CsBr_xI_{(1-x)}$:Eu scintillator is first applied on a substrate followed by an annealing step. After the annealing step, the exposure of the scintillator screen to electromagnetic radiation can be performed as described in § 4, followed by the step of coupling the scintillator to the detector of the FPD.

In another preferred embodiment, the FPD comprising an annealed $CsBr_xI_{(1-x)}$:Eu scintillator is exposed to electromagnetic radiation as described above in § 4.

In another preferred embodiment, a FPD comprising a $CsBr_xI_{(1-x)}$:Eu scintillator is first annealed and then exposed to electromagnetic radiation as described above in § 4.

In another preferred embodiment, the $CsBr_xI_{(1-x)}$:Eu material can be annealed before it is coated or deposited on a substrate. After the annealing step, the scintillator screen is coupled to the detector.

The scintillator is also suitable to be combined with a photomultiplier tube for high energy radiation detection such as gamma ray detection or image detection in for example gamma scanners. Because the light is emitted in all directions, all photons which do not directly reach the photo cathode of the PMT have to be directed to reach the photo cathode by internal reflection. For many applications, truncated-cone and parabolic shapes of scintillators give the most satisfactory results, but simple shapes like rods and blocks, which are less expensive to fabricate, are often good enough. To promote internal reflection the parallel surfaces of the scintillator should be in some cases, reflectively coated. The most suitable coatings consist of MgO, $TiO_2$ or Al.

The coupling between the scintillator and the photo cathode of the PMT can be done via direct coupling or light guided coupling. In the case of direct coupling, the scintillator surface is butted together with the cathode window. Use of a mating compound such as silicone grease, with a refractive index close to the refractive indices of the scintillator and the glass, is necessary to minimize interface losses. In the case of light-guide coupling a light guide is used between the scintillator surface and the window of the cathode. The usual materials are glass, fused silica, polystyrene, polyvinyltoluene, and especially polymethyl methacrylate.

In a FPD or radiation detection apparatus, a wavelength shifting material can be included to better match the wavelength of the emitted light by the scintillator with the sensitivity spectrum of the detector. The wavelength shifting material is optically coupled to the scintillator and optically coupled to the detector. Examples of wavelength shifting material which are suitable for the invention are disclosed in Table I of WO2012104798.

While the present invention will hereinafter in the examples be described in connection with preferred embodiments thereof, it will be understood that it is not intended to limit the invention to those preferred embodiments.

EXAMPLES

1. Materials

Most materials used in the following examples are readily available from standard sources such as ALDRICH CHEMICAL Co. (Belgium), ACROS (Belgium), VWR (Belgium) and BASF (Belgium) unless otherwise specified. All materials are used without further purification unless otherwise specified.

Caesium Iodide (CsI): (CAS 7789-17-5) 99.999%; from Rockwood Lithium;

Ceasium Bromide (CsBr): (CAS 7787-69-1) 99.999%; from Rockwood Lithium;

CEBLA: Caesium Europium Bromide ($CsEuBr_3$) from Agfa—Healthcare;

Thallium Iodide (TlI): 99.999%; from Rockwood Lithium;

$TiO_2$ TR-52 from Huntsman;

CAB 381-2: 20(wt.)% of Cellulose Acetate Butyrate (CAB-381-2) from Eastman in MEK;

Baysilon: Baysilon Paint additive MA from Bayer;

Ebecryl: 20(wt.)% of Ebecryl 1290 in MEK, a hexafunctional aliphatic urethane acrylate oligomer from Allnex in MEK;

Filter AU09E11NG with pore size of 20 μm from 3M

A-G CP-Bu: Radiological film from Agfa Healthcare;

SE4 CAWO: Powder scintillator screen based on calcium tungstate ($CaWO_4$) from CAWO;

CAWO Superfine 115 SW: Powder scintillator based on gadolinium oxysulphide (GOS:Tb) from CAWO;

Black polyethylene bag: PE, Type B, 260×369 mm, 0.19 mm thickness, from Cornelis Plastic;

Stann JF-95B: dispersant from Sakyo;

Disperse Ayd™ 9100: anionic surfactant/Fatty Ester dispersant from Daniel Produkts Company;

Kraton™ FG1910X: (new name=Kraton™ FG1901 GT), a clear, linear triblock copolymer based on styrene and ethylene/butylene with a polystyrene content of 30%, from Shell Chemicals;

Black PET substrate: polyethylene terephthalate (PET) film with a thickness of 0.188 mm, obtained from Toray, trade name Lumirror X30;

Aluminium 318G: plate from Alanod having a thickness of 0.3 mm.

$EuI_2$: from SAFC Hitech 99.9% CAS 22015-35-6.

2. Measuring Methods 2.1 Conversion Efficiency with Scintillator Screen/Radiological Film Set-Up.

The conversion efficiency of the scintillator screens was determined in a scintillator screen/radiological film (S/F) set-up. To guarantee optimal contact between scintillator screen and radiological film, a vacuum packaging was used. The scintillator screen with its scintillators side was brought in contact with an A-G CP-Bu radiological film and both components were placed in a black polyethylene bag. The whole package was light tight and vacuum packaged. Exposure was through the scintillator, in front of the radiological film. The exposure for measuring the conversion efficiency was performed by a Philips Super 80 CP X-ray source with following conditions: 72 kVp, E-filter, distance range over 615 cm, 21 steps with d log H of 0.10, 10 mAs, small focus. The substrate side of the scintillator screen was directed towards the X-ray source. After exposure, the radiological film was developed in G138i (Agfa Healthcare) at 33° C. for 90s and placed in a MacBeth densitometer, type TR-924 to measure the optical density of the developed film. The conversion efficiency was determined by means of the density graph in the region wherein the density is linear with the irradiation dose and was calculated relative to a reference scintillator screen. Unless otherwise specified, the reference scintillator screen is SE4 CAWO, and has been chosen due to its stable performance under irradiation and blue colour emission under X-ray irradiation.

2.2 Afterglow

The afterglow was measured with an X-ray source Pantak-Seifert Isovolt 16-M2/0.4-1.5 working in continuous radiation mode, together with a shutter FPS900M of the company Cedrat, to generate X-ray pulses with very high radiation dose of 0.56 Gy/s. The shutter was mounted at a distance of 25 cm from the X-ray source and had an open diaphragm of 2 mm diameter. The rise time of the shutter was 30 ms. To avoid scattering of X-rays two diaphragms of lead were installed, on both sides of the shutter. The position of the shutter (open-closed) was changed by applying a voltage to the digital input of the electronics of the shutter. To create a pulse series with a chosen frequency and pulse length, a pulse generator HP 8116A was used. The distance between the scintillator screen and the shutter was fixed at 8 cm. The scintillator was exposed to the X-ray source having following conditions: 70 kVp, 20 mAs, large focus, no external filters. The generator parameters were fixed: HIL=2.5 Volt, LOL=0 Volt, Frequency: 30 mHz.

The light generated by the scintillator was captured with optical fibres and was further guided into a spectrofluorometer (Fluorlog from Jobin Yvon) and measured. The measured wavelength was fixed at the maximum of the light emission of the scintillator and it was continuously measured within the time between 2 cycles (on/off) in a range from 0.1 to 1 s. After all data was collected, each cycle was separated and the curves measured between cycles were analysed. To reduce the noise level all cycles were averaged and a spectrum was provided.

2.3 Conversion Efficiency of the Scintillator Screen by Measurement of the Light Emission.

2.3.a. Dynamic Mode

Measurement of the conversion efficiency in dynamic mode was done by recording the light emission spectra of the scintillator screens with a spectrofluorometer (Fluorlog from the company Jobin Yvon) in a wavelength range between 370 and 700 nm. Exposure was done by placing the scintillator under the X-ray source Pantak-Seifert. The exposure conditions of the X-ray source were: 70 kVp, 10 mAs, a distance from X-ray to scintillator of 90 cm and a 21 mm Al filter. The X-ray beam-quality corresponds with the norm RQA5 (RQA X-ray beam qualities as defined in IEC standard 61267, $1^{st}$ Ed. (1994)). The emitted light was captured with an optical fibre and transferred to the spectrofluorometer where it was stored on its computer and the light emission spectrum was generated. The conversion efficiency was calculated as an integral of the spectrum between 370 and 700 nm.

2.3.b. Kinetic Mode

Measurement of the conversion efficiency in kinetic mode was done by recording the light emission from scintillator screens in a continuous mode, i.e. in function of the X-ray radiation dose, with the same spectrofluorometer used for the dynamic mode. The spectrofluorometer was set to the detection at a fixed wavelength of 450 nm corresponding to the maximum of the emission of the $CsBr_xI_{(1-x)}$:Eu scintillator, unless specified otherwise. The conversion efficiency was taken at the maximum value of detected light emission in function of X-ray dose. The X-ray source conditions were set to 70 kVp, 20 mAs, the distance from the X-ray source to the scintillator was 80 cm, and no external filters were used. The light emission was integrated with 0.17 Gy radiation intervals.

3. Preparation of Scintillator Screens 3.1. Preparation of the Substrate of the Scintillator Screens For the preparation of the scintillator screens, 2 types of substrates were used: Al plates without a pre-coat and Al plates with a pre-coat.

To prepare a pre-coat, a coating dispersion was prepared by mixing 0.2 g of CAB 381-2 with 1 g of $TiO_2$ TR-52, 0.001 g of Baysilon and 2.6 g of MEK in a horizontal agitator bead mill. Ebecryl was added to achieve a weight ratio CAB 381-2:Ebecryl of 1:1. The solution was filtered with Filter AU09E11NG. The solid content of $TiO_2$ TR-52 in the coating dispersion is 35(wt.)%. The coating dispersion was coated with a doctor blade at a coating speed of 2 m/min on the aluminium 318G plate with a size of 18×24 cm. The wet layer thickness was 150 µm as to obtain a dry layer thickness of 17 µm. The drying of the pre-coat was done at room temperature for at least 15 min, followed by drying in an oven for 30 min at 60° C. and 20 min at 90° C.

3.2. Preparation of Needle Based $CsBr_xI_{(1-x)}$:Eu Scintillator Screens.

$CsBr_xI_{(1-x)}$:Eu needle scintillator screens according to the present invention (Inv. Scr. 1-17) were obtained via physical vapour deposition (PVD) of CsI and $CsEuBr_3$ on Al plates with or without a pre-coat (see § 3.1). A mixture containing 210 g of CsI and 2.1 g of $CsEuBr_3$ was placed in a crucible in a vacuum deposition chamber. As the content of bromide in the obtained scintillator is only originating from the $CsEuBr_3$, the $CsBr_xI_{(1-x)}$:Eu scintillators (Inv. Scr. 1-17) consist essentially of CsI:Eu. The crucible was subsequently heated to a temperature of 680-690° C. and the vaporized compounds were deposited onto the substrate.

$CsBr_{0.08}I_{0.92}$:Eu needle scintillator screens (Inv. Scr. 18) were obtained via physical vapour deposition (PVD) of CsI, CsBr and CsEuBr$_3$ on Al plates without a pre-coat. A mixture containing 189 g of CsI, 21 g of CsBr and 2.1 g of CsEuBr$_3$ was placed in a crucible in a vacuum deposition chamber. The crucible was subsequently heated to a temperature of 680-690° C. and the vaporized compounds were deposited onto the substrate. The bromide to iodide ratio in the deposited scintillator was determined by means of potentiometric titration.

The distance between the crucible and the substrate was fixed at 20 cm. During evaporation, the substrate was rotated at 12 r.p.m. and kept at a temperature of 140° C. Before the start of the evaporation, the chamber was evacuated to a pressure of $5\times10^{-5}$ mbar and during the evaporation process argon gas was introduced into the chamber. The process took from 115 till 160 min, depending on the coating weight.

After the evaporation process the scintillator screen and the chamber were cooled down to room temperature and the scintillator was removed from the vacuum chamber. Each scintillator screen was weighed and the coating weight was obtained by applying formula 1. The coating weights of the thus obtained scintillator screens Inv. Scr. 1 to Inv. Scr. 18 are reported in Table 1.

$$(W_F - W_S)/A_S \quad \text{Formula 1}$$

Where:
$W_F$=weight of the scintillator screen,
$W_S$=weight of the substrate,
$A_S$=surface area of the substrate.

3.3. Preparation of Needle Based CsI:Eu Scintillator Screen.

This scintillator was prepared in the same way as described in § 3.2. (Inv.Scr. 1-17) but CsEuBr$_3$ was replaced by EuI$_2$. The coating weight was determined according to formula 1 and is reported in Table 1.

3.4. Preparation of an Undoped CsI Scintillator Screen (Comp. Scr. 1).

This scintillator was prepared in the same way as described in § 3.2. (Inv.Scr. 1-17) but no CsEuBr$_3$ was used. The coating weight was determined according to formula 1 and is reported in Table 1.

3.5. Preparation of Needle CsBr$_x$I$_{(1-x)}$:Eu scintillator screens which will not be annealed (Comp. Scr. 2/3/4).

Needle CsBr$_x$I$_{(1-x)}$:Eu scintillator screens which will not be annealed (see below) were prepared in the same way as described in § 3.2 (Inv.Scr. 1-17) and the coating weight is reported in Table 1.

3.6. Preparation of a CsI:Tl Scintillator Screen (Comp. Scr. 5).

A CsI:Tl scintillator was prepared in the same way as described in § 3.2 (Inv.Scr. 1-17) but the CsEuBr$_3$ was replaced by 2.6 g of thallium iodide. The coating weight of the obtained screen Comp. Scr. 5 as determined by formula 1 is reported in Table 1.

TABLE 1

| Scintillator screen | Substrate | Composition | Coating weight (mg/cm$^2$) |
|---|---|---|---|
| Inv. Scr. 1 | Al plate + pre-coat | CsBr$_x$I$_{(1-x)}$:Eu | 50.2 |
| Inv. Scr. 2 | Al plate + pre-coat | CsBr$_x$I$_{(1-x)}$:Eu | 49.2 |
| Inv. Scr. 3 | Al plate + pre-coat | CsBr$_x$I$_{(1-x)}$:Eu | 116.6 |
| Inv. Scr. 4 | Al plate + pre-coat | CsBr$_x$I$_{(1-x)}$:Eu | 114.8 |
| Inv. Scr. 5 | Al plate + pre-coat | CsBr$_x$I$_{(1-x)}$:Eu | 115.1 |
| Inv. Scr. 6 | Al plate + pre-coat | CsBr$_x$I$_{(1-x)}$:Eu | 52.8 |
| Inv. Scr. 7 | Al plate + pre-coat | CsBr$_x$I$_{(1-x)}$:Eu | 52.7 |
| Inv. Scr. 8 | Al plate + pre-coat | CsBr$_x$I$_{(1-x)}$:Eu | 52.6 |
| Inv. Scr. 9 | Al plate + pre-coat | CsBr$_x$I$_{(1-x)}$:Eu | 45.9 |
| Inv. Scr. 10 | Al plate + pre-coat | CsBr$_x$I$_{(1-x)}$:Eu | 88.1 |
| Inv. Scr. 11 | Al plate + pre-coat | CsBr$_x$I$_{(1-x)}$:Eu | 116.6 |
| Inv. Scr. 12 | Al plate + pre-coat | CsBr$_x$I$_{(1-x)}$:Eu | 51.6 |
| Inv. Scr. 13 | Al-plate | CsBr$_x$I$_{(1-x)}$:Eu | 41.7 |
| Inv. Scr. 14 | Al -plate | CsBr$_x$I$_{(1-x)}$:Eu | 45.9 |
| Inv. Scr. 15 | Al-plate | CsBr$_x$I$_{(1-x)}$:Eu | 42.9 |
| Inv. Scr. 16 | Al-plate | CsBr$_x$I$_{(1-x)}$:Eu | 42.6 |
| Inv. Scr. 17 | Al-plate | CsBr$_x$I$_{(1-x)}$:Eu | 42.7 |
| Inv. Scr. 18 | Al-plate | CsBr$_{0.08}$I$_{0.92}$:Eu | 41.1 |
| Inv. Scr. 19 | Al plate + pre-coat | CaI:Eu | 42.1 |
| Comp. Scr. 1 | Al plate + pre-coat | CsI | 48.7 |
| Comp. Scr. 2 | Al plate + pre-coat | CsBr$_x$I$_{(1-x)}$:Eu | 49.3 |
| Comp. Scr. 3 | Al plate + pre-coat | CsBr$_x$I$_{(1-x)}$:Eu | 118.5 |
| Comp. Scr. 4 | Al plate + pre-coat | CsBr$_x$I$_{(1-x)}$:Eu | 51.6 |
| Comp. Scr. 5 | Al plate + pre-coat | CsI:Tl | 130.0 |
| Ref. Scr. 1 | — | SE4 CAWO | 46.9 |

3.7. Preparation of Powder Based Scintillator Screens 0.013 g of Stann JF-95B and 0.009 g of Disperse AYD™ 9100 were mixed in 0.153 g of toluene and 0.103 g of butyl acetate. The mixture was mixed in a Turbula® shaker-mixer T2F for 30 min. To that mixture, 0.256 g of methylcyclohexane was added and again mixed in the Turbula® shaker-mixer T2F for 30 min. Finally, a mixture containing 0.087 g of Kraton™ FG1901 GT, 0.145 g of methylcyclohexane, 0.087 g of toluene and 0.058 g of butyl acetate was added and mixed for another 30 min. To 0.91 g of the so obtained binder solution, 0.5 g of CsI material or mixtures thereof (see below) was added and mixed for another 30 min.

Inv. Scr. 10 was prepared with CsBr$_x$I$_{(1-x)}$:Eu material which was obtained by removing the annealed CsI:Eu needle scintillator layer from a scintillator layer obtained as described in § 3.2 and § 4, and having a coating weight of 112 mg/cm$^2$. The annealing of the CsBr$_x$I$_{(1-x)}$:Eu needle scintillator was done as described in § 4 for the Inv. Scr. 1-12. After removal from the substrate, the material was pulverized in a mortar before adding it to the binder solution.

Inv. Scr. 21 was prepared with CsBr$_x$I$_{(1-x)}$:Eu material obtained by mixing 0.49 g of CsI and 0.1 g of CEBLA as powders. The mixture was placed in the oven and heated at 1° C./min until a temperature of 660° C., where it was kept for 1 h. Hereafter the oven was switched off and the material was let to cool down. The obtained material, also called the fired material was subsequently pulverized and annealed for 1 h at 160° C. in an oven. After cooling down it was added to the binder solution.

Inv. Scr. 22 was prepared with CsBr$_x$I$_{(1-x)}$:Eu obtained by mixing 0.49 g of CsI and 0.1 g of CEBLA. The material was pulverized in a mortar and annealed for 1 h at 160° C. in an oven and after cooling down, added to the binder solution.

Comp. Scr. 6 is prepared by mixing 0.49 g CsI and 0.1 g of CEBLA and added to the binder solution.

Comp. Scr. 7 is prepared by mixing 0.49 g CsI and 0.1 g of CEBLA, pulverized and added to the binder solution.

The dispersions obtained by adding CsI:Eu or a mixture of CsI+CEBLA, as obtained above, to the binder solution as described above, were poured into a stainless steal mould having inside dimensions of 3.0×2.5 cm and 1.0 cm height wherein the black PET substrate was placed. The dispersions in the mould were dried in an oven at 50° C. for 10 h. Hereafter, the obtained powder based scintillator screen was removed from the mould and was further dried in the air for 1 day.

4. Process of Annealing the CsI:Eu and $CsBr_xI_{(1-x)}$:Eu Scintillator Screens The needle based scintillator screens Inv. Scr. 1 to Inv. Scr. 12, Inv. Scr. 18, Inv. Scr. 19 and Comp. Scr. 1 were placed in an oven with air circulation and the temperature was set to 170° C. The scintillator was kept at that temperature for a time period of 1 h. The $CsBr_xI_{(1-x)}$:Eu needle based scintillator screens Inv. Scr. 13 to Inv. Scr. 17 were annealed in the same oven at temperatures in a range between 100° C. and 300° C. and kept at these temperatures for a time period between 0.5 h and 24 h. After the time period has lapsed, the $CsBr_xI_{(1-x)}$:Eu needle based scintillator screens were allowed to cool down.

5. Exposure of an Annealed $CsBr_xI_{(1-x)}$:Eu Needle Scintillator to Electromagnetic Radiation.

5.1 X-Rays

Inv. Scr. 1 to Inv. Scr.6 were exposed to X-ray radiation with an X-ray source Pantak-Seifert Isovolt 16-M2/0.4-1.5 in continuous radiation mode, in such a way that half of each scintillator screen was exposed to an X-ray dose of 17 Gy with a dose rate of 0.3 Gy/min. The X-ray source conditions were: 70 kVp, 5 mAs, no external filter, distance to the X-ray source 80 cm unless otherwise specified. The other half of each scintillator screen was covered with a lead plate having a thickness of 1 mm to avoid any exposure.

5.2 Xenon Lamp Irradiation

Inv. Scr. 8 and 9 were exposed with a Xenon lamp (Suntest XLS+, Atlas) emitting light from 300 nm to 800 nm. The exposure was performed in 2 ways: a) a half of the scintillator screen was exposed with a total light intensity of 765 W/m2 for 2 h with the second part covered; and b) the scintillator screen was exposed with a circular beam of 11 mm diameter at a fixed dose rate of 0.483 J/s·m² for 0.75-24 h.

5.3 UV light irradiation

Inv. Scr. 10 was exposed with an OMT-lamp-unit build-in Xenon-lamp (Hamamatsu) of 75 W with a narrow-band-transmission filter having a central wavelength of 365 nm. The scintillator screens were exposed with a circular beam of 11 mm diameter and at a fixed dose rate of 0.176 J/s·m² for 0.5 to 24 h.

6. EPR Spectra

The EPR spectra of the $CsBr_xI_{(1-x)}$:Eu material were measured on a Bruker® ELEXSYS E500, Q-band EPR/ENDOR spectrometer at Ghent University, at room temperature (25° C.), with the following settings: microwave frequency of 34 GHz, microwave power of 20 mW, field modulation frequency of 100 kHz, field modulation amplitude of 0.5 mT, receiver gain of 60 dB, scan time of 20 min and time constant of 80 ms. The $CsBr_xI_{(1-x)}$:Eu material was removed from the substrate with a cleaving knife and pulverized. The pulverized material was introduced into Q-band quartz tubes with outer diameter of 2 mm and inner diameter of 1.4 mm, to a height of 5 mm and the spectra were collected.

Figure 1:
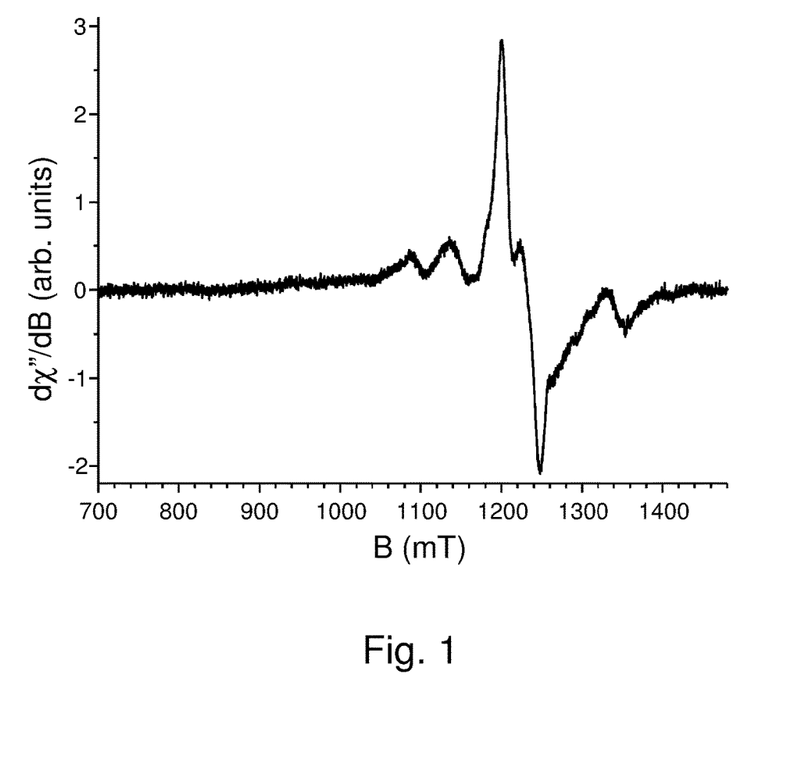
FIG. 1: EPR spectrum of a $CsBr_xI_{(1-x)}$:Eu annealed scintillator measured at room temperature (25° C.) and at a frequency of 34 GHz, with the magnetic field scanned from 500 to 1600 mT. Maxima are visual at magnetic fields: 1090 mT, 1140 mT, 1200 mT, 1220 mT, and minima at 1250 mT and 1350 mT. The signal with a maximum at 1200 mT has the largest peak height.
Figure 2:
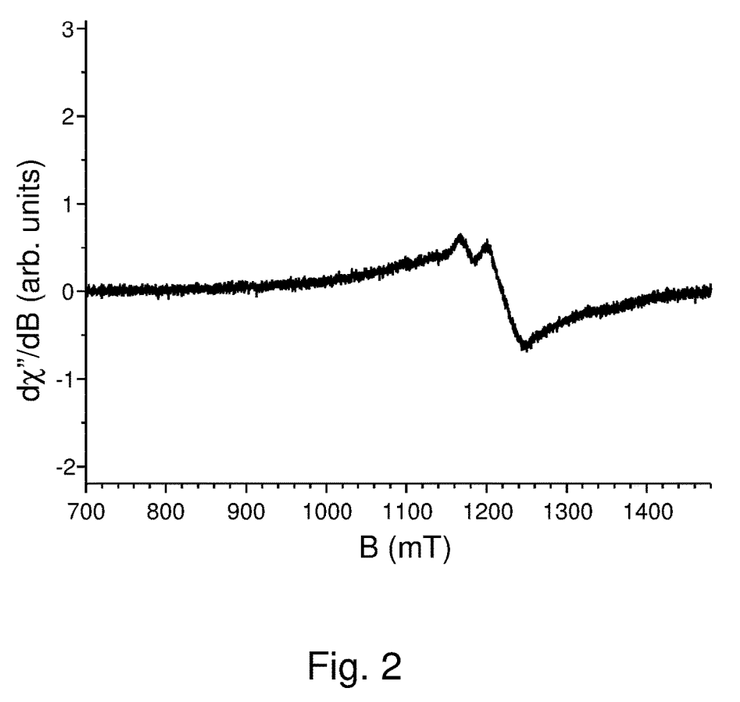
FIG. 2: EPR spectrum of a $CsBr_xI_{(1-x)}$:Eu scintillator which is not annealed, measured at room temperature (25° C.) and at a frequency of 34 GHz, with the magnetic field scanned from 500 to 1600 mT.

The EPR spectrum of the annealed needle $CsBr_xI_{(1-x)}$:Eu scintillator Inv. Scr. 11 is shown in FIG. 1 and of the non-annealed needle $CsBr_xI_{(1-x)}$:Eu scintillator Comp. Scr. 3 is shown in FIG. 2.

The EPR spectrum of the annealed needle $CsBr_xI_{(1-x)}$:Eu scintillator Inv. Scr. 11 showed maxima in signal height at magnetic fields of 1090 mT, 1140 mT and 1200 mT, and minima at 1250 mT and 1350 mT. The maximum in signal height at 1200 mT showing the largest peak height from all maxima. The peak height is defined as the difference between the absolute value of the signal at its maximum and the value of the signal at the minimum situated at the lower side in magnetic field of the peak. The signal height at 1090 mT and 1140 does not exceed normalised signal height of 40% wherein the normalised signal height percentage at 1200 mT is being calculated as 100%. The absolute height of the signals can differ depending on parameters such as coating weight and measuring circumstances.

The EPR spectrum of the non-annealed needle $CsBr_xI_{(1-x)}$:Eu scintillator Comp. Scr. 3 is characterised by a broad spectrum, clearly different from the spectrum of the annealed sample and is further characterised by a peak in signal height at 1200 mT being not the highest. Sometimes, measured EPR spectra of non-annealed $CsBr_xI_{(1-x)}$:Eu material showed very small maxima at 1090 mT and 1140 m. However the normalised signal height of at least one of these maxima exceeds 40%, whereby the normalised signal height percentage at 1200 mT is being calculated as 100%.

Figure 5:
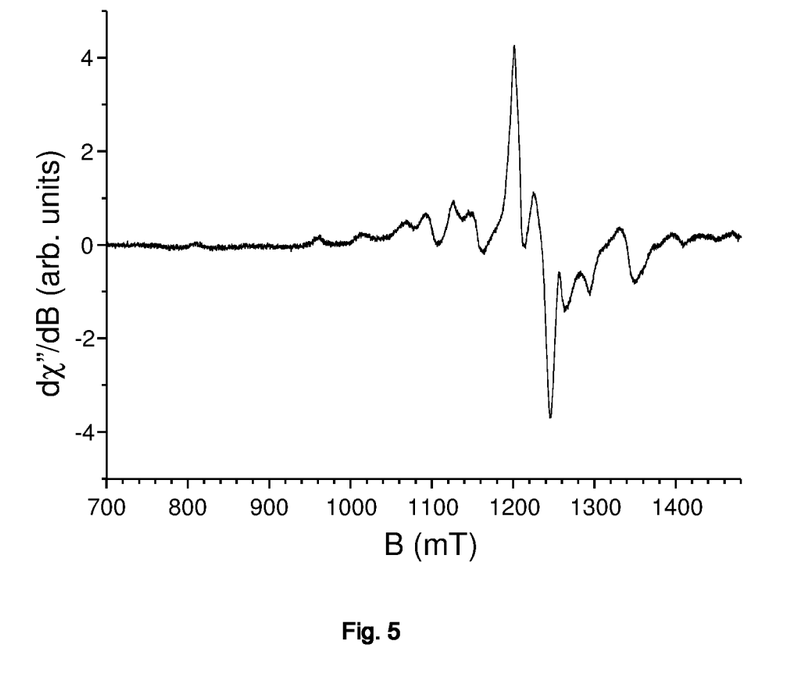
FIG. 5: EPR spectrum of a CsI:Eu annealed scintillator measured at room temperature (25° C.) and at a frequency of 34 GHz, with the magnetic field scanned from 500 to 1600 mT. A maximum is visual at a magnetic field of 1200 mT and minima at 1240 mT and 1350 mT. The signal with a maximum at 1200 mT has the largest peak height.
Figure 6:
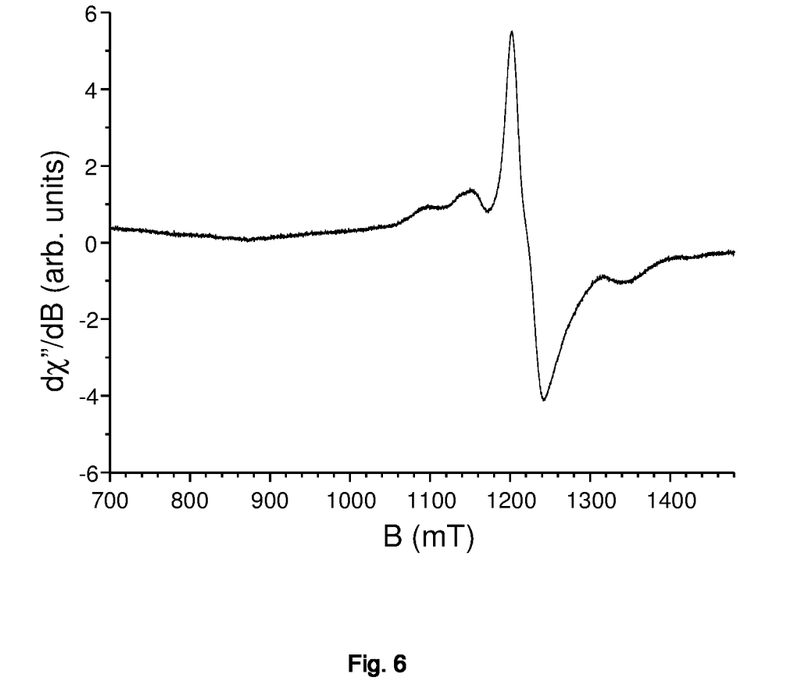
FIG. 6: EPR spectrum of a $CsBr_{0.08}I_{(0.92)}$:Eu annealed scintillator measured at room temperature (25° C.) and at a frequency of 34 GHz, with the magnetic field scanned from 500 to 1600 mT. A maximum is visual at a magnetic field of 1200 mT and minima at 1240 mT and 1340 mT. The signal with a maximum at 1200 mT has the largest peak height.

The EPR spectrum of the annealed needle CsI:Eu scintillator Inv. Scr. 19 is shown in FIG. 5 and of the annealed needle $CsBr_{0.08}I_{(0.92)}$:Eu scintillator Inv. Scr. 18 is shown in FIG. 6.

The EPR spectrum of the annealed needle CsI:Eu scintillator Inv. Scr. 19 showed a maximum in signal height at a magnetic field of 1200 mT. The peak height is defined as the difference between the absolute value of the signal at its maximum and the value of the signal at the minimum situated at the lower side in magnetic field of the peak. The signal height at 1090 mT and 1140 mT do not exceed normalised signal height of 40% wherein the normalised signal height percentage at 1200 mT is being calculated as 100%. This EPR spectrum is very characteristic for the CsI:Eu after annealing and only the absolute height of the signals can differ depending on parameters such as coating weight and measuring circumstances.

The EPR spectrum of the annealed needle $CsBr_{0.08}I_{(0.92)}$:Eu scintillator Inv. Scr. 18 showed a maxima in signal height at a magnetic field of 1200 mT. The peak height is defined as the difference between the absolute value of the signal at its maximum and the value of the signal at the minimum situated at the lower side in magnetic field of the peak. The signal height at 1090 mT and 1140 mT do not exceed normalised signal height of 40% wherein the normalised signal height percentage at 1200 mT is being calculated as 100%. This EPR spectrum is very characteristic for the $CsBr_{0.08}I_{(0.92)}$:Eu after annealing and only the absolute height of the signals can differ depending on parameters such as coating weight and measuring circumstances.

7. Results of Conversion Efficiency Measurements 7.1 Conversion Efficiency of an Annealed and A Non Annealed Scintillator Screen.

The conversion efficiency of the scintillator screens Inv. Scr. 12 and Comp. Scr. 4 with Ref. Scr. 1 as a reference (conversion efficiency=1), hereafter denoted as relative conversion efficiency, were measured according to the method described in § 2.1. The results are included in Table 2.

TABLE 2

| Scintillator screen | Annealing step | Relative conversion efficiency |
|---|---|---|
| Inv. Scr. 12 | 1 h at 170° C. | 0.47 |
| Comp. Scr. 4 | no | 0.15 |

The annealing step clearly increased the conversion efficiency of the scintillator screen based on $CsBr_xI_{(1-x)}$:Eu scintillators comprising of crystals having a needle like structure.

7.2 Conversion Efficiency Measurement in Dynamic Mode After X-Ray Irradiation.

Light emission under X-ray excitation was measured of Inv. Scr. 1, Comp. Scr. 1 and Comp. Scr.2 as described in § 2.3.a. before and after X-ray exposure. The X-ray exposure is performed as described in § 5.1. The emission spectra of parts of the scintillator screen which were not exposed to electromagnetic radiation, have a maximum at 450 nm, except undoped CsI which has a maximum at a much lower wavelength, and having a rather low signal. The spectra measured after exposure to X-ray irradiation showed a change in conversion efficiency signal. No shifts in wavelength were observed for both Inv. Scr. 1 and Comp. Scr. 1-2, but in both cases the intensity of the spectra changed. Due to the exposure to X-rays, the conversion efficiency increased of the Eu-doped and annealed $CsBr_xI_{(1-x)}$ screen (Inv. Scr. 1), while the conversion efficiency decreased of the undoped CsI scintillator screen (Comp. Scr. 1) and the Eu doped $CsBr_xI_{(1-x)}$ scintillator screen which had not been annealed (Comp. Scr. 2). The conversion efficiency of the screens after X-ray exposure, relative to the conversion efficiency before X-ray exposure is reported in Table 3. The conversion efficiency before X-ray exposure is calculated as 1 for all the screens.

TABLE 3

| Scintillator screen | Relative conversion efficiency after X-ray irradiation |
|---|---|
| Inv. Scr. 1 | 2.2 |
| Comp. Scr. 1 | 0.6 |
| Comp. Scr. 2 | 0.4 |

7.3 Conversion Efficiency in Kinetic Mode at 450 nm After X-Ray Radiation

Figure 3:
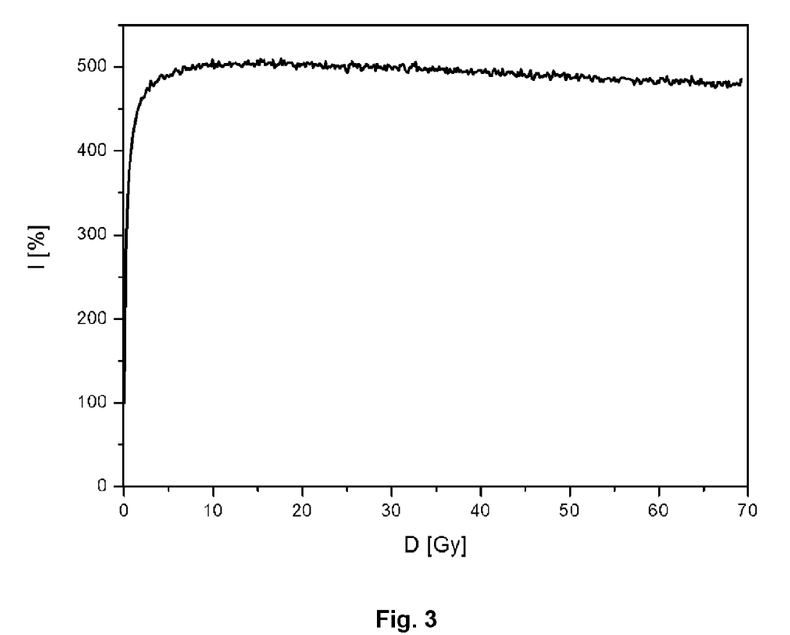
FIG. 3: Light conversion signal (at 450 nm) of a $CsBr_xI_{(1-x)}$:Eu annealed scintillator with a coating weight of 49.2 mg/cm$^2$, in function of the absorbed X-ray dose (D).

The conversion efficiency of the scintillator screen (Inv. Scr. 2) was measured as described in § 2.3.b. The increase of the conversion efficiency started immediately after even a very low dose of X-ray irradiation according to § 5.1, such as 0.1 Gy and increased to a maximum until the total dose of around 12 Gy is achieved (see FIG. 3). At the total dose of about 12 Gy the conversion efficiency saturates even when higher dose of irradiation were provided. From an X-ray irradiation dose of about 12 Gy to a dose of about 28 Gy, the conversion efficiency levels off at 500% of the conversion efficiency when no irradiation was applied yet. The results of the same measurement as described in Gektin et al. (Radiation damage of CsI:Eu crystals. Functional Materials, 20; n.2 (2013)—STC "Institute for Single Crystals" of National Academy of Sciences of Ukraine) do show on the contrary that irradiation leads to emission suppression at X-ray doses of less than 100 Gy.

7.4 Conversion Efficiency of Scintillator Screens After Exposure to X-Rays for Different Coating Weights The conversion efficiency of the scintillator screens, Inv. Scr. 3 to Inv. Scr. 6 was measured in S/F set-up as described in § 2.1 before and after X-ray exposure according to § 5.1. The conversion efficiency of the non-exposed scintillator screens is taken as a reference and equal to 1. The conversion efficiency increased by a factor of about 3 for high coating weights, and a factor of about 2 for low coating weights with respect to the non-exposed parts of the scintillator screens (see Table 4).

TABLE 4

| Scintillator screen | Relative conversion efficiency after X-ray irradiation |
|---|---|
| Inv. Scr. 3 | 3.3 |
| Inv. Scr. 4 | 3.1 |
| Inv. Scr. 5 | 3.3 |
| Inv. Scr. 6 | 2.1 |

The conversion efficiency, measured in a S/F set-up as described in § 2.1., of Inv. Scr. 7 was compared with Ref. Scr. 1. Ref. Scr. 1 did not show an increase in conversion efficiency after X-ray exposure. Half of the Inv. Scr. 7 was exposed to a total X-ray dose of 748 Gy (70 kVp, 5 mA, 80 cm distance, no external filter), with a dose rate of 0.3 Gy/min and a total time of irradiation of 4 h 48 min. The other half of the scintillator screen was covered with a lead plate having a thickness of 1 mm to avoid any exposure of the screen. The conversion efficiencies of both halves of the screen were measured and compared to Ref. Scr. 1 to obtain relative conversion efficiencies. The Inv. Scr. 7 showed a relative conversion efficiency of a factor of 3.5 higher than the relative conversion efficiency of the non exposed part of the scintillator screen. The relative conversion efficiencies of non-exposed and exposed parts of scintillator screen Inv. Scr. 7 are shown in Table 5. The results show that although the conversion efficiency of the Inv. Scr. 7, after annealing was lower than Ref. Scr. 1, the irradiation with X-rays increased the conversion efficiency of the screen to a higher value than the reference screen Ref. Scr. 1.

TABLE 5

| Scintillator screen | Relative conversion efficiency non-exposed | Relative conversion efficiency after X-ray exposure |
|---|---|---|
| Inv. Scr. 7 | 0.43 | 1.49 |

7.5. Conversion Efficiency Measurements and EPR Spectra of Scintillator Screens Annealed at Different Temperatures and in Different Time Periods.

The conversion efficiency of Inv. Scr. 13 to 19, which were annealed at different temperatures for different time periods, were measured in the kinetic mode as described in § 2.3.b. The value of the relative conversion efficiency at maximum value in function of X-ray dose with the efficiency of the non-annealed screen as a reference (=1) is reported in Table 6.

TABLE 6

| Scintillator Screen | T (° C.) of annealing | t (h) of annealing | Relative conversion efficiency |
|---|---|---|---|
| Inv. Scr. 13 | 100 | 0.5 | 1.3 |
| Inv. Scr. 13 | 100 | 1 | 1.4 |
| Inv. Scr. 13 | 100 | 3 | 1.7 |
| Inv. Scr. 13 | 100 | 24 | 4.7 |
| Inv. Scr. 14 | 135 | 0.5 | 2.4 |
| Inv. Scr. 14 | 135 | 1 | 3.1 |
| Inv. Scr. 14 | 135 | 3 | 6.1 |
| Inv. Scr. 14 | 135 | 24 | 14.5 |
| Inv. Scr. 15 | 200 | 0.5 | 10.5 |
| Inv. Scr. 15 | 200 | 1 | 8.1 |
| Inv. Scr. 15 | 200 | 3 | 6.7 |
| Inv. Scr. 15 | 200 | 24 | 3.5 |
| Inv. Scr. 16 | 250 | 0.5 | 3.5 |
| Inv. Scr. 16 | 250 | 1 | 3.0 |
| Inv. Scr. 16 | 250 | 3 | 2.1 |
| Inv. Scr. 17 | 300 | 0.5 | 0.85 |
| Inv. Scr. 17 | 300 | 1 | 0.28 |
| Inv. Scr. 17 | 300 | 3 | 0.15 |
| Inv. Scr. 17 | 300 | 24 | 0.12 |
| Inv. Scr. 18 | 135 | 1 | 4.50 |
| Inv. Scr. 18 | 170 | 1 | 8.50 |
| Inv. Scr. 18 | 200 | 1 | 4.65 |
| Inv. Scr. 19 | 170 | 1 | 10.10 |

From the results reported in Table 6 it can be seen that annealing of the scintillator screens based on $CsBr_xI_{(1-x)}$:Eu crystals having a needle like structure at temperatures below 300° C. show a higher conversion efficiency with respect to the non-annealed scintillator screens.

The EPR spectra of the $CsBr_xI_{(1-x)}$:Eu crystals having a needle like structure and which were over-annealed at 300° C. are characterised by a broad spectrum, clearly different from the spectra of the annealed sample and are further characterised by the absence of maxima at 1090 mT and 1140 mT and of a minimum at 1350 mT.

7.6 Conversion Efficiency of Scintillator Screens After Exposure to Light

Half of the scintillator screens Inv. Scr. 8 and Ref. Scr. 1 were exposed to the Xe lamp as described in § 5.2.a. The relative conversion efficiency was measured in dynamic mode according to § 2.3.a for both the exposed and not exposed areas with respect to Ref. Scr. 1. The results are reported in Table 7. The increase in relative conversion efficiency due to the exposure to light is 2.7.

TABLE 7

| Scintillator screen | Relative light conversion signal of non-exposed part | Relative light conversion signal of the part exposed to visible light |
|---|---|---|
| Inv. Scr. 8 | 0.46 | 1.23 |

The scintillator screen Inv. Scr. 9 was exposed with circular beams of the Xe lamp as in § 5.2.b and a half of the scintillator screen Inv. Scr. 10 was exposed with circular beams of UV light as in § 5.3. The relative conversion efficiency was measured in dynamic mode according to § 2.3.a for all exposed areas with reference to the non-exposed area and the results are summarised in Table 8.

TABLE 8

| Scintillator screen | Light source (exp. Method) | Dose [J/m²] | Relative conversion efficiency |
|---|---|---|---|
| Inv. Scr. 9 | Xe-lamp (§5.2) | 1739 | 1.29 |
| Inv. Scr. 9 | Xe-lamp (§5.2) | 10433 | 1.68 |
| Inv. Scr. 9 | Xe-lamp (§5.2) | 20866 | 1.84 |
| Inv. Scr. 9 | Xe-lamp (§5.2) | 27821 | 1.84 |
| Inv. Scr. 9 | Xe-lamp (§5.2) | 41731 | 1.79 |
| Inv. Scr. 10 | UV-lamp (§5.3) | 1267 | 2.81 |
| Inv. Scr. 10 | UV-lamp (§5.3) | 2534 | 2.85 |
| Inv. Scr. 10 | UV-lamp (§5.3) | 5069 | 2.76 |
| Inv. Scr. 10 | UV-lamp (§5.3) | 10138 | 2.66 |

An increase in conversion efficiency due to exposure to light was observed. The increase in conversion efficiency due to UV irradiation was higher than the increase due to visible light irradiation.

7.7. Conversion Efficiency Measurements of Powder Based Scintillator Screens.

Each of the screens was measured in dynamic and kinetic mode. The signal to noise ratio and the maximum emission was determined of the light emission spectra while the conversion efficiency, relative to the conversion efficiency before X-ray irradiation was determined in the kinetic mode (see § 2.3.b). The results are reported in Table 9.

TABLE 9

| Screen | Maximum light emission (nm) | Relative conversion efficiency | Signal to noise ratio |
|---|---|---|---|
| Inv. Scr. 10 | 450 | 6.5 | high |
| Inv. Scr. 21 | 450 | 2 | high |
| Inv. Scr. 22 | 450 | 2 | low |
| Comp. Scr. 6 | Broad: 500-550 | 1.2 | high |
| Comp. Scr. 7 | Broad: 500-550 | 1.2 | high |

All the scintillator screens obtained by annealed $CsBr_xI_{(1-x)}$:Eu material showed an increase in conversion efficiency due to X-ray exposure and a higher conversion efficiency than scintillator screens obtained with non-annealed CsI:Eu material. The best results were obtained for the scintillator screen obtained by pulverizing annealed $CsBr_xI_{(1-x)}$:Eu needles. The conversion efficiency of the non-annealed screens was within the experimental error and it is not to be considered as an increase in conversion efficiency.

8. Afterglow Measurements

Figure 4:
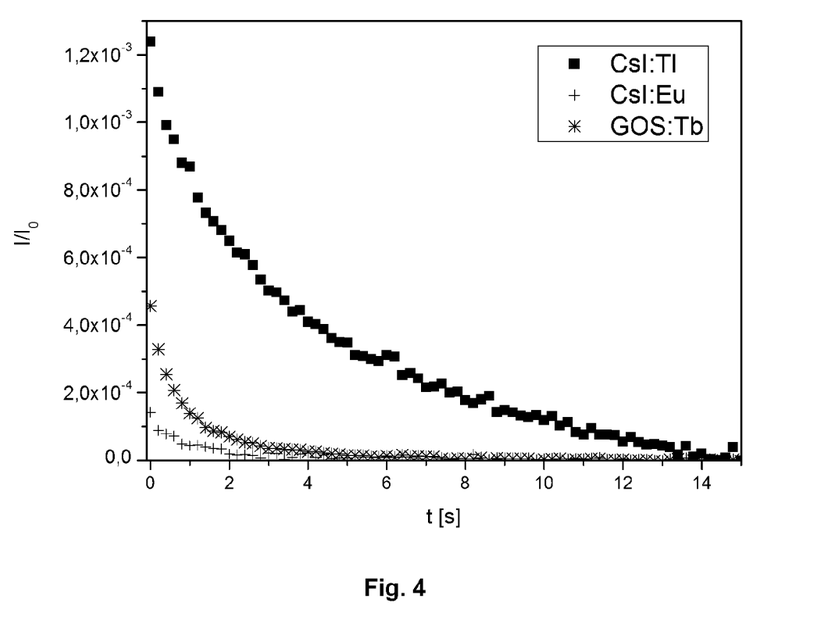
FIG. 4: Comparison of afterglow, measured after X-ray exposure in a range of 0 to 14 s of different scintillators, based on CsI:Tl, GOS:Tb and $CsBr_xI_{(1-x)}$:Eu. The $CsBr_xI_{(1-x)}$:Eu scintillator shows the lowest afterglow and is 10 times lower than CsI:Tl.

The afterglow of Inv. Scr. 1 after annealing as described in § 4, was measured according to § 2.2 in comparison with 2 scintillator screens: Comp. Scr. 5 and CAWO Superfine 115 SW. The results are shown in FIG. 4. As can be seen, the afterglow of a scintillator based on $CsBr_xI_{(1-x)}$:Eu after annealing, is much lower than the afterglow of a CsI:Tl based scintillator.

These results prove that annealing the scintillator based on $CsBr_xI_{(1-x)}$:Eu increases the conversion efficiency for X-rays into light while maintaining the afterglow to a very low level, making the invention very suitable for high speed radiographic imaging and high energy radiation detection. Moreover, the replacement of Tl by Eu represents less safety issues for operators during the production of $CsBr_xI_{(1-x)}$ based scintillators.

The invention claimed is:

1. A method of preparing a scintillator including CsI doped with Eu, the method comprising the steps of:

providing CsI:Eu material by mixing CsI with an Eu containing compound; and annealing by exposing the CsI:Eu material to heat so as to obtain a temperature from 50° C. to 280° C. for at least 5 min.

2. The method according to claim 1, wherein the CsI is mixed with the Eu containing compound in a melt.

3. A method of preparing a scintillator screen comprising the steps of:

performing the steps of claim 2;

pulverizing the CsI:Eu material before the step of annealing;

following the step of annealing, dispersing the pulverized material in a solution including a binder; and subsequently coating the dispersion on a substrate.

4. The method of preparing a scintillator screen according to claim 3, further comprising the step of:

exposing the dispersion coated substrate to electromagnetic radiation having a wavelength between 1 pm and 800 nm.

5. The method according to claim 4, wherein the electromagnetic radiation is UV-light or visible light and has a dose between 10 and 400000 J/m$^2$.

6. A method of making a flat panel detector for radiological image detection, the method comprising the steps of:

performing the steps of claim 3; and coupling the scintillator screen to a detector including a plurality of photosensitive elements which convert light into an electric signal.

7. The method according to claim 1, further comprising the step of:

exposing the annealed CsI:Eu material to electromagnetic radiation having a wavelength between 1 pm and 800 nm.

8. A method of preparing a scintillator screen comprising the steps of:

performing the steps of claim 7; wherein the CsI is mixed with the Eu containing compound in a gas phase; and the CsI:Eu material is deposited on a substrate via vapour deposition.

9. A method of preparing a flat panel detector for radiological image detection, the method comprising the steps of:

performing the steps of claim 8; and coupling the deposited CsI:Eu material to a detector including a plurality of photosensitive elements which convert light into an electric signal.

10. The method according to claim 9, wherein the step of exposing is performed before the step of coupling to the detector.

11. The method according to claim 9, wherein the electromagnetic radiation is UV-light or visible light and has a dose between 10 and 400000 J/m$^2$.

12. A method of preparing a scintillator screen comprising the method steps of:

performing the steps of claim 1; wherein the CsI is mixed with the Eu containing compound in a gas phase; and the CsI:Eu material is deposited on a substrate via vapour deposition.

13. A method of preparing a flat panel detector for radiological image detection, the method comprising the steps of:

performing the steps of claim 12; and coupling the deposited CsI:Eu material to a detector including a plurality of photosensitive elements which convert light into an electric signal.

14. The method according to claim 13, wherein the step of annealing is performed after the step of coupling to the detector.

15. A method of preparing a scintillator screen comprising the steps of:

performing the steps of claim 1;

pulverizing the CsI:Eu material before the step of annealing;

following the step of annealing, dispersing the pulverized material in a solution including a binder; and subsequently coating the dispersion on a substrate.

16. A method of making a flat panel detector for radiological image detection, the method comprising the steps of:

performing the steps of claim 15; and coupling the scintillator screen to a detector including a plurality of photosensitive elements which convert light into an electric signal.

17. A method of making a high energy radiation detection apparatus, the method comprising the steps of:

performing the steps of claim 1; and coupling the scintillator with a photocathode of a photo multiplier tube.

* * * * *